United States Patent [19]

Pilato

[11] Patent Number: 4,935,738
[45] Date of Patent: Jun. 19, 1990

[54] PROCESS FOR TRANSMITTING SIGNALS BETWEEN TWO ELEMENTS AND DEVICE FOR CARRYING OUT SAID PROCESS

[75] Inventor: René Pilato, Tournan, France

[73] Assignee: Precision Mecanique Labinal, France

[21] Appl. No.: 148,521

[22] Filed: Jan. 26, 1988

[30] Foreign Application Priority Data

Jan. 28, 1987 [FR] France ................. 87 00983

[51] Int. Cl.$^5$ ............................................. G08C 19/22
[52] U.S. Cl. ............................. 340/870.24; 340/445; 340/448; 340/870.31; 340/870.37; 73/146.5
[58] Field of Search ............. 340/448, 445, 870.24, 340/870.19, 870.18, 870.26, 870.31, 870.35, 870.37; 318/341; 375/2, 3; 370/10, 11, 8; 73/146.4, 146.5

[56] References Cited

U.S. PATENT DOCUMENTS

| | | | |
|---|---|---|---|
| 3,303,701 | 2/1967 | Matsuura et al. | 340/870.37 |
| 4,242,666 | 12/1980 | Reschovsky et al. | 340/870.19 |
| 4,737,761 | 4/1988 | Dosjoub et al. | 340/448 |

FOREIGN PATENT DOCUMENTS

| | | |
|---|---|---|
| 1207942 | 2/1960 | France . |
| 2359397 | 2/1978 | France . |
| 2497342 | 12/1980 | France . |
| 2529513 | 1/1984 | France . |
| 2122757A | 1/1984 | United Kingdom . |

Primary Examiner—Parshotam S. Lall
Assistant Examiner—Tyrone Queen
Attorney, Agent, or Firm—Larson and Taylor

[57] ABSTRACT

A method and apparatus are provided wherein there is associated with each value of a measurement of a parameter such as pressure, for transmission through an electromagnetic coupling device, a time duration or period which is a function of the measured value. A first, start signal of relatively short duration is transmitted and thereafter, at the end of a period which is a function of the parameter, a second, ending signal of relatively short duration is transmitted. A receiving device which is responsive to said signals, measures the elapsed time between them, i.e., measures the length of the intervening period, and converts this measurement into a measure of the parameter.

28 Claims, 1 Drawing Sheet

PROCESS FOR TRANSMITTING SIGNALS BETWEEN TWO ELEMENTS AND DEVICE FOR CARRYING OUT SAID PROCESS

The present invention relates to a process for transmitting signals between two elements, in particular between a rotary element, for example an aircraft or vehicle wheel, and a fixed element, for example a chassis, or an aircraft or vehicle structure, said signals representing, for example, values of parameters relating to the behavior of a pneumatic tire, such as for example temperature and/or pressure.

The invention also concerns a device for carrying out said process.

A large number of devices have already been proposed for transmitting a signal relating to a parameter, between a wheel and a fixed structure of a vehicle or aircraft, the parameter most often transmitted relating to the pressure in a pneumatic tire A large number of projects described in literature simply teach the detection in the wheel of a change in a single state occurring when the pressure has exceeded a given threshold value resulting in the closure of a pressure controller, this change of state being detected by various couplings, such as electromagnetic or capacitive couplings. Such devices provide data which is too rudimentary to have a real practical application.

A number of other devices employing suitable coupling means between the wheel and the fixed structure permit effecting measurements of parameters on the wheel, for example measurements of pressure and/or temperature in the tire, and transmitting the results of these measurements to the fixed structure through coupling means. Bearing in mind the high degree of reliability required in the transmission of data on which the safety of a vehicle or aircraft may depend and the particularly difficult electromagnetic and physical environment, such devices must be particularly well-designed and adapted for the problems to be solved.

Thus, for example, French Patent No. 2,497,342 discloses a device in fact employed for the electromagnetic transmission of measurements relating to a parameter of an aircraft wheel to the structure of the aircraft through an electromagnetic coupling combined with a particularly elaborate utilization of frequencies, both for the transmission of the results of the measurement in the wheel-structure direction and for the supply of energy in the structure-wheel direction for supplying power to the electronic circuit of the wheel associated with the detectors.

Further, French Patent Application No. 2,529,513 discloses a device which is particularly adapted for the transmission of measurements relating to parameters of ground vehicle wheels by means of a capacitive coupling ensuring a differential transmission, it being possible, as the case may be, to supply energy to the wheel electronic unit by means of a local source, such as a battery or accumulator, placed on the wheel or transmitted to the latter from the chassis through the coupling.

In all the cases of these elaborate devices for transmitting a large number of very precise measurements between the wheel and the fixed structure, one of the main difficulties to be solved resides in the consumption of electric energy related to the transmission and it is highly desirable to arrange that this consumption be as low as possible. However, another requirement which is just as compelling, results from the necessity to ensure a transmission of signals which may be easily distinguished, with substantially complete reliability, from the background noises and interferences which result from a particularly difficult environment, and this requirement is the more difficult to satisfy as the available electric power for the transmission is lower.

In both of the aforementioned devices, these difficulties have been partly resolved owing to the encoding of the measurements of the parameter in frequency, for example in F.S.K. encoding. The use of these devices in a real environment has shown that a high reliability of the coupling was obtained at the cost of a relatively moderate consumption of energy. Nonetheless, it would be particularly desirable to still further reduce the consumption of energy while retaining, and even improving, the reliability of the transmission of the measured parameters.

It has already been proposed in French Patent No. 2,359,397 to transmit results of measurement, for example the temperature or pressure, coming from a suitable detector, by transmitting pulses, in particular optical pulses, so that the lapse of time between two consecutive pulses corresponds to the actual measured value of the physical magnitude, a receiver being responsive to this lapse of time. Such a device enables the consumption of energy to be reduced, but provides only low reliability which is incompatible with the safety requirements of, for example, ground or air transport vehicles. Independently of the fact that it requires a continuous operation, it does not permit, unless special and complex algorithms are provided, distinguishing a transmission or reception error from a variation in the measurement. Moreover, it is sensitive to interferences and incapable of detecting a systematic breakdown, such as, for example, the disappearance of every other signal.

In a completely different field, there has been proposed in French Patent No. 1,207,942 a sequential transmission of a high number of signals from one point to another at a single frequency by means of signalling pulses the spacing of which relative to the synchronizing pulses is a characteristic of the signalling to be transmitted. Each of the considered lines therefore operates at a frequency which is a submultiple of the single transmission frequency and is synchronized by this transmission frequency in such manner that there is superimposed on a first alternation of a carrier sine-wave realizing said single frequency, a fine synchronizing pulse and, after a new period, there is found, on the third alternation, a signalling pulse whose characteristics are sufficiently distinct from the synchronizing pulse to be distinguished from the latter upon detection, it being possible for said synchronizing pulse not to be transmitted as a function of the state of the different channels of the circuits upon transmission. Such a device requires the presence of a carrier wave and is sensitive to the noise of the latter. It only permits the transmission of signalling of the on-off type and therefore cannot be adapted to the case of a detector, for example a pressure or temperature measuring detector. Such a device is not economical of energy and it is particularly sensitive to noises liable to affect the carrier wave.

The invention therefore proposes attaining this object without requiring a modification of the coupling means of existing devices.

Another object of the invention is to provide a process for transmitting signals between a rotary element and a fixed element, in particular between a wheel and a fixed structure, which permits increasing the quantity of data which may be transmitted, while reducing the energy required for this transmission by avoiding in particular the necessity of a carrier wave.

The invention may also be applied to the transmission of signals between any two fixed or movable elements, and another object of the invention is to provide a process for transmission between two elements which are not interconnected by a physical connection with the aforementioned advantages.

The invention provides a process for transmitting signals between two elements, for example a rotary element and a fixed element, in which values of measurements relating to one or more parameters in one of the elements, for example a rotary element, are processed in the form of signals adapted to be transmitted to receiving means of the other element, for example a fixed structure, through coupling means which are preferably electromagnetic or capacitive, there being associated with each parameter measurement value to be transmitted through the coupling means, a duration which is a function of said value, wherein there is first of all transmitted, through the coupling means, a first signal, or start signal, of short duration, adapted for transmission through said coupling means, while thereafter allowing a silence to elapse for a duration which is a function of said parameter value and, at the end of said duration of silence, transmitting a second signal, or end signal, of short duration, adapted for transmission through said coupling means, said second signal being preferably distinctly different from said first signal, means responsive to the duration between directly consecutive start and end signals being arranged, at the fixed structure, for converting said duration into a parameter value.

Thus, the duration between the start signal and the end signal is independent of the conditions of transmission and transport of the start or end signal and may assume any desired value, as a function of the value to transmit, no energy-consuming carrier wave being necessary.

Furthermore, a sequence of transmission of a parameter value may be initiated when desired, and in particular at a great distance from a preceding sequence, which also reduces the consumption of energy and renders the device substantially insensitive to noise and interferences.

In fact, the duration which is a function of the parameter measurement value may or may not incorporate, according to the desired choice, the short duration of the first signal and the short duration of the second signal. In practice, it is preferred that this duration start at the end of the first signal and terminate at the end of the second signal.

The same process may also be employed for simultaneously transmitting data in the structure-to-wheel direction, for example for the actuation of particular sequences in electronic equipment associated with the rotary element, such as for example a wheel.

The first and/or the second signal may be signals having a given frequency adapted for transmission through the coupling means, the frequency of the first signal being distinctly different from that of the second signal. As a modification, the first and second signals may be at the same frequency and differ by their duration. Any other different signals adapted for transmission through the coupling means may also be employed.

The coupling means employed in this process are preferably electromagnetic coupling means, for example of the rotating transformer type, or capacitive coupling means, preferably in the form of a differential capacitive coupling employing two equal and parallel capacitances, such as in particular those disclosed in French Patent Nos. 2,497,342 and 2,529,513.

The invention also provides a device for carrying out said process, comprising, on the rotary element, at least one detector for at least one parameter to be measured, and an electronic circuit associated with said detector, wherein the circuit comprises means for converting the parameter value measured by the detector into a duration which is a function of said value, means for producing a first signal at the start of said duration and means for producing a second signal at the end of said duration, said signals being sent to the coupling means.

The coupling means between the rotary element and the fixed structure may advantageously be electromagnetic coupling means. In this case, it may be, if desired, arranged to transmit data or energy from the fixed structure to the rotary element, or, on the contrary, there may be provided on the rotary element a source of energy such as a battery or an accumulator.

In another embodiment, the coupling means may be of the capacitive type and it is then preferred to provide on the rotary element a source of energy such as a battery or an accumulator.

The interval of time is preferably an increasing function of the value of the data to be transmitted, this function being for example linear, logarithmic or exponential.

Preferably, the duration of the first signal or start signal and the duration of the second signal or end signal exceed 100 microseconds and are less than 500 microseconds, the frequency of said signals being preferably on the order of for example 40 to 60 kHz for the start signal and for example 80 to 120 kHz for the end signal.

Further features and advantages of the invention will be apparent from the following description given by way of a non-limitative example, with reference to the accompanying drawing in which.

Figure 1:
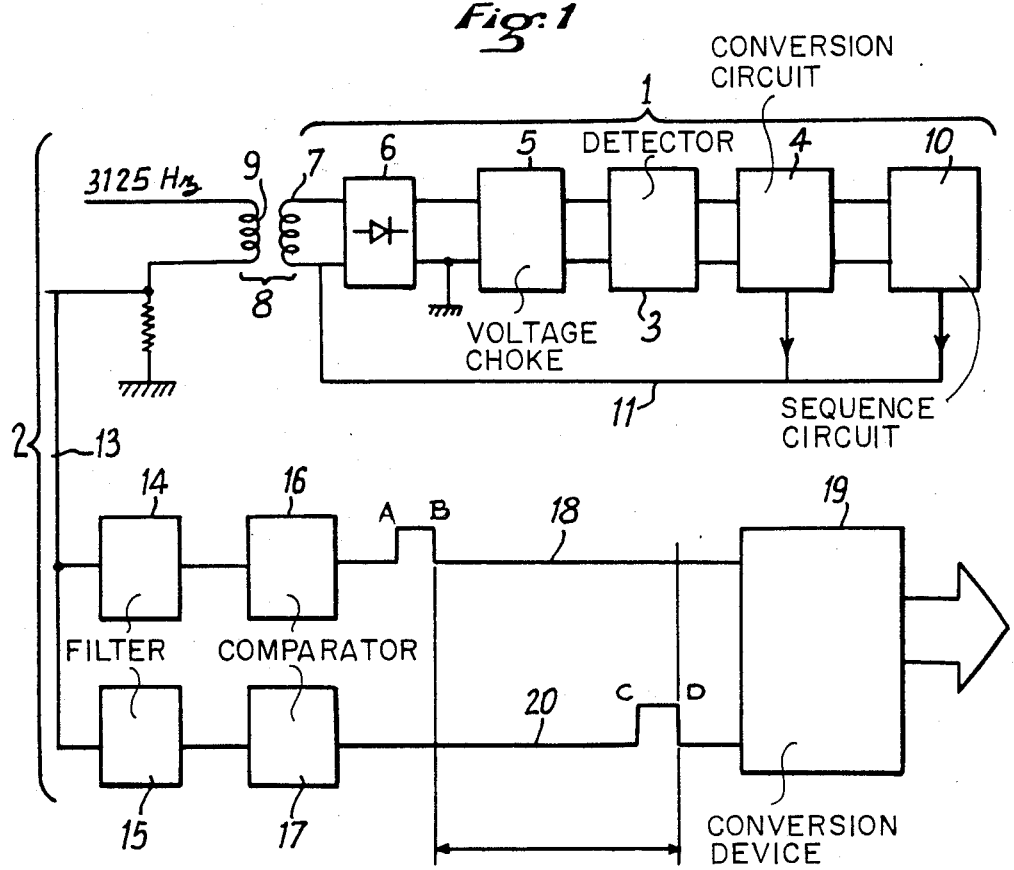
FIG. 1 is a diagrammatic view of a device according to the invention.

With reference to FIG. 1, an installation according to the invention comprises a wheel circuit, generally designated by the reference character 1, and a fixed circuit disposed on a non-rotating structure and generally designated by the reference character 2.

The circuit 1 mounted on the wheel is designed around a pressure detector 3 of the piezo-electric type capable of sending an electric signal corresponding to the measured value of the pressure to a pressure/time conversion circuit 4. This circuit 4 may be for example built around a capacitor whose discharge duration depends on the magnitude of the charge coming from the detector, or a pulse counter capable of counting a number of pulses which is a function of the value measured by the detector and obtained by a conventional analog-/digital converter.

The electronic circuit pertaining to the detector is supplied with power by a voltage choke 5 supplied with power by a rectifier 6 connected to the terminals of the secondary winding 7 of a rotary transformer 8 whose primary winding 9 is carried by the fixed circuit part 2.

A sequence circuit 10 is connected to the converting device 4 for producing a first signal, or start signal, for each measurement of the detector, and a second signal, or end signal, at the end of the duration determined by the converter 4. More precisely, the end of the transmission of the start signal by the circuit 10 causes the start of the counting of the time by the circuit 4 whereas the end of this counting by the circuit 4 causes the transmission of an end signal by the circuit 10. The start and end signals are sent to the secondary winding 7 through the channel 11 for transmission, through the electromagnetic coupling, to the primary winding 9 of the rotary transformer 8.

This rotary transformer is of the type disclosed in French Patent No. 2,497,342 and is capable of sending, in the primary-to-secondary direction, energy to the circuit 11 at a first frequency of 3,125 kHz or any other frequency which may be suitable for the application of the system and, in return, in the secondary-to-primary direction, the sequence of data composed of a first signal, a silence whose duration is a function of the measured value of the pressure, and a second signal, or end signal, the first and second signals being superimposed on a carrier wave at one or two frequencies of 50 and/or 100 kHz or any other frequency suitable for the application of the system. Said signals may occur at any moment of the period of the carrier wave. The carrier wave may also be absent so as to still further reduce the consumption of energy.

On the fixed part, the primary winding 9 is connected, on one hand, to an electric generator of said first frequency of 3,125 Hz or any other frequency suitable for the application of the system and, on the other hand, through an exploitation channel 13, to two filters connected in parallel, one filter 14 for detecting a signal at 50 kHz for example and the other filter 15 for detecting a signal at 100 kHz for example, the outputs of said filters being connected to respective comparators 16, 17. The channel 18 leading from the comparator 16 and the filter 14 transmits the start signal to a device 19 for converting time into pulses. Likewise, the channel 20 leading from the filter 15 and the comparator 17 sends the end signal to the device 19. The latter is actuated when it receives a start pulse and stopped when it receives an end pulse and converts the duration between the two pulses into a numerical signal which may be used either by a device displaying a pressure value or by a computer causing the inflation or deflation.

Figure 2:
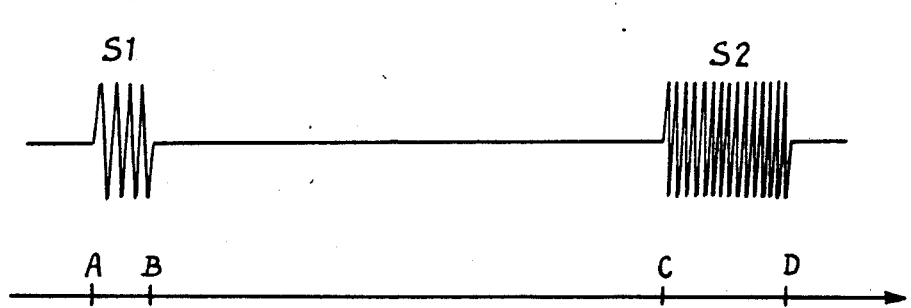
FIG. 2 is a diagram of a sequence of signals of the process according to the invention.

Reference will be made to FIG. 2 in which are shown all of the signals passing through the secondary winding 7, apart from the carrier sine-wave which has a frequency of, for example, 3,125 Hz.

As explained before, when the pressure detector has effected a measurement, the value of which it wishes to transmit, there is effected a transmission of a first signal S1 which is for example a 50 kHz sine-wave signal whose duration AB is for example 250 microseconds. At the end B of the start signal S1, a time BC is allowed to elapse during which no signal is transmitted. This lapse of time BC is proportional to the value of the pressure to be transmitted and there may be advantageously chosen a pressure variation on the order of 0.14 bars per 10 microseconds of time BC. When the time BC has elapsed, the second signal S2 is transmitted, for example at a frequency of 100 kHz, the duration of this signal CD being 250 microseconds.

By using values of this order it is possible to transmit pressure values which vary between 0.07 bar and 21 bars, which usually correspond to the variations in the pressure of pneumatic tires at the rate of 500 pressure values transmitted per second, bearing in mind the voltage rise durations.

To be significant, the shortest duration of BC may advantageously be on the order of 5 microseconds, the longest duration being advantageously on the order of 1,500 microseconds.

As concerns the device 19, one may advantageously use as the variable duration, function, for example a proportional function, of the value of the pressure to be transmitted, the duration BD which includes the duration of the signal S2, this having the advantage of employing the start signal S1 for rendering the receiving device responsive which ensures the detection of the end B of the first signal S1 and also renders the device responsive for detecting with as much precision the end D of the signal S2 whose length CD is also fixed, whereas the start C of the signal S2 can be a perfectly random start with respect to time, start A of the signal S1 also being a random start, at least as seen from the fixed detection part of the device.

In the embodiment just described, the first signal S1, or start signal, and the second signal S2, or end signal, are characterized by their frequency, which enables the receiving devices to identify this signal as a start or end signal. It will be understood that other signals could be used for constituting start or end signals. Thus, signals of numerical type may be for example used.

In an improvement of the invention, the start signal and/or end signal may be themselves distinguishable by their own duration. Thus, the duration of the end signal may be for example double the duration of the start signal, which makes it possible to have a start signal and an end signal of the same frequency. For more safety, there may be used start and end signals which have both different frequencies (or other different characters) and different durations.

Lastly, in a particularly advantageous improvement, there may be employed start and/or end signals which are themselves variable and capable of transmitting data. Thus, for example, the start signal may have a variable duration determined for example by a temperature measurement in the wheel and the end signal may have a variable duration representing for example the "label" of the pressure detector (the label representing the equation of a temperature variation curve, for example for the detectors). In this way, it is possible to know and correct error due to the temperature in the value of data such as pressure.

The start and/or end signals may also be encoded for transmitting valid data on the basis of values other than the variation of their duration. However, the use of the variation of their duration for encoding data is preferable in the framework of the present invention, not only owing to greater simplicity of the signal processing means, the receiving and interpreting means, but also to the great safety and improved reliability of the process according to the invention.

Although the invention has been described in respect of a particular embodiment, it must be understood that the scope thereof is in no way limited thereto and that various modifications may be made therein without departing from the scope or spirit of the invention as defined in the appended claims.

I claim:

1. A process for transmitting signals between a first element, in particular a rotary element, and a second element, said process comprising the steps of measuring values relating to at least one parameter in one of said elements to produce measured values, processing each measured value in the form of signals for transmission to a receiving means of the other element through coupling means, associating with each measured value for transmission through said coupling means a duration which is a function of said measured value, said processing step comprising first transmitting through said coupling means a first of said signals of short duration adapted for transmission through said coupling means, thereafter transmitting no signals through said coupling means for a period the duration of which is a function of said measured value and independent of conditions of transmission of said first signal and, at an end of said period of no signal transmission, transmitting a second signal of short duration also adapted for transmission through said coupling means, the second signal being distinctly different from the first signal, and converting the elapsed time between a said first signal and a said second signal directly following that first signal into a parameter value by a means responsive to said elapsed time.

2. A process according to claim 1, wherein said first signal is a start signal and said second signal is an end signal.

3. A process according to claim 1, wherein said first signal has a frequency which characterizes said first signal.

4. A process according to claim 1, wherein said second signal has a frequency which characterizes said second signal.

5. A process according to claim 1, wherein said first signal and said second signal each have a frequency which characterizes the respective signal.

6. A process according to claim 1, wherein said first signal has a duration which characterizes said first signal.

7. A process according to claim 1, wherein said second signal has a duration which characterizes said second signal.

8. A process according to claim 1, wherein said first signal and said second signal have durations which characterize the respective signals.

9. A process according to claim 1, wherein said first signal has a variable characteristic for encoding variable data.

10. A process according to claim 1, wherein said second signal has a variable characteristic for encoding variable data.

11. A process according to claim 1, wherein said first signal and said second signal have variable characteristics for encoding variable data.

12. A process according to claim 1, wherein said first signal has a variable duration for encoding variable data.

13. A process according to claim 1, wherein said second signal has a variable duration for encoding variable data.

14. A process according to claim 1, wherein said first signal and said second signal have variable durations for encoding variable data.

15. A process according to claim 1, wherein said elapsed time between said first and second signals is the elapsed time between the end of said first signal and the end of said second signal.

16. A process according to claim 1, wherein a carrier-wave is associated with each of said first and second signals, which signals modulate the respective carrier-wave.

17. A process according to claim 1, wherein said coupling means are electromagnetic coupling means.

18. A process according to claim 17, wherein said electromagnetic coupling means comprise a rotary transformer.

19. A process according to claim 1, wherein said coupling means are capacitive coupling means, circuits for transmitting said signals of said first element and said second element being arranged for a differential transmission of said signals for eliminating interferences.

20. A process according to claim 19, wherein said capacitive coupling means comprise two identical capacitances.

21. A process according to claim 1, wherein said first element is a wheel and said second element is a fixed structure, said process further comprising transferring in an opposite direction electric energy from said fixed structure to said wheel.

22. A process according to claim 1, wherein the processing of said measured value is made according to a proportional function.

23. A device for carrying out a process for transmitting signals between a first element, in particular a rotary element, and a second element and comprising the steps of measuring values relating to at least one parameter in one of said elements to produce measured values, processing each measured value in the form of signals for transmission to a receiving means of the other element through coupling means, associating with each measured value for transmission through said coupling means a duration which is a function of said measured value, said processing step comprising first transmitting through said coupling means a first of said signals of short duration adapted for transmission through said coupling means, thereafter transmitting no signals through said coupling means for a period the duration of which is a function of said measured value and independent of conditions of transmission of said first signal and, at an end of said period of no signal transmission, transmitting a second signal of short duration also adapted for transmission through said coupling means, the second signal being distinctly different from the first signal, and converting the elapsed time between a said first signal and a said second signal directly following that first signal into a parameter value by a means responsive to said elapsed time, said device comprising, on said first element, at least one detector for at least one parameter to be measured, and an electronic circuit associated with said detector, said electronic circuit comprising means for converting the parameter value measured by the detector into a duration which is a function of said measured value, and means for producing a first signal at the start of said duration and a second signal at the end of said duration and for sending said signals to said coupling means.

24. A device according to claim 23, comprising a device for converting time into pulses and wherein said second element includes a circuit which is responsive to said signals and comprises two filters connected in parallel, one filter being adapted to filter said first signal and the other filter being adapted to filter said second signal and defining two channels for respectively sending said first signal and said second signal to said device for converting time into pulses.

25. A device according to claim 24, wherein said converting device is adapted to ensure the conversion of time elapsing between the end of said first signal and the end of said second signal.

26. A device according to claim 23, wherein said coupling means comprise a rotary transformer.

27. A device according to claim 23, wherein said coupling means comprises capacitive coupling means.

28. A device according to claim 27, wherein said capacitive coupling means comprise two parallel capacitances for effecting a differential transmission.

* * * * *